US012072277B2

(12) United States Patent
Cooksey et al.

(10) Patent No.: US 12,072,277 B2
(45) Date of Patent: Aug. 27, 2024

(54) MULTIPLEXED AMPLITUDE MODULATION PHOTOMETER AND PERFORMING MULTIPLEXED AMPLITUDE MODULATION PHOTOMETRY

(71) Applicant: Government of the United States of America, as represented by the Secretary of Commerce, Gaithersburg, MD (US)

(72) Inventors: Gregory Alan Cooksey, Gaithersburg, MD (US); Paul Nathan Patrone, Washington Grove, MD (US); Anthony Jose Kearsley, Hanover, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 972 days.

(21) Appl. No.: 17/084,683

(22) Filed: Oct. 30, 2020

(65) Prior Publication Data
US 2021/0055201 A1 Feb. 25, 2021

Related U.S. Application Data

(63) Continuation-in-part of application No. 15/967,966, filed on May 1, 2018, now Pat. No. 11,035,707.
(Continued)

(51) Int. Cl.
*G01N 15/1434* (2024.01)
*G01N 15/1404* (2024.01)

(52) U.S. Cl.
CPC ..... *G01N 15/1436* (2013.01); *G01N 15/1404* (2013.01)

(58) Field of Classification Search
None
See application file for complete search history.

(56) References Cited

U.S. PATENT DOCUMENTS 7,245,379 B2 7/2007 Schwabe
7,709,821 B2 5/2010 Casstevens et al.
(Continued)

OTHER PUBLICATIONS

D. Ross, et al., "Imaging of electroosmotic flow in plastic microchannels", Anal. Chem., 2001, p. 2509-2515, 73.
(Continued)

*Primary Examiner* — Luke D Ratcliffe
(74) *Attorney, Agent, or Firm* — Office of Chief Counsel for National Institute of Standards and Technology (57) ABSTRACT

A multiplexed amplitude modulation photometer includes a microchannel; a first input light path that: receives a first modulated light at a first modulation frequency; and communicates the first modulated light to a first optical region that receives the first analyte that produces a first output light including the first modulation frequency communicated to a first detection light path; the first optical region; the first detection light path that receives the first output light; a second input light path that: receives a second modulated light with a second modulation frequency; and communicates second modulated light to a second optical region that receives the second analyte that produces a second output light with the second modulation frequency communicated to a second detection light path; the second optical region; and the second detection light path that receives the second output light from the second optical region.

6 Claims, 9 Drawing Sheets

Related U.S. Application Data

(60) Provisional application No. 62/576,709, filed on Oct. 25, 2017.

(56) References Cited

U.S. PATENT DOCUMENTS

| | | |
|---|---|---|
| 8,101,426 B2 | 1/2012 | Durack et al. |
| 8,717,569 B2 | 5/2014 | Lo et al. |
| 2006/0219873 A1 | 10/2006 | Martin et al. |
| 2013/0004987 A1* | 1/2013 | Lo .................... B01L 3/502707 356/338 |
| 2013/0037726 A1* | 2/2013 | Kiesel ................ G01N 21/6428 250/458.1 |
| 2019/0120673 A1 | 4/2019 | Cooksey et al. |

OTHER PUBLICATIONS

M. Ahrens, et al., "Design and uncertainty assessment of a setup for calibration of microfluidic devices down to 5nl min-1", Measurement and Science Technology, 2014, p. 1-9, 25.

M. Ahrens, et al., "An experimental setup for traceable measurement and calibration of liquid flow rates down to 5 nL/min", Biomed. Eng.—Biomed. Tech., 2015, p. 337-345, 60(4).

H. Hosseinkhannazer, et al., "Two-species microparticle detection in optofluidic biochips with polymeric waveguides", Proceedings of SPIE: Photonics North 2008, 2008, vol. 7099.

V. Lien, et al., "Microfluidic flow rate detection cased on integrated optical fiber canitlever", The Royal Society of Chemistry: Lab on a Chip, 2007, p. 1352-1356, 7.

E. Pedrol, et al., "Optofluidic device for the quantification of circulating tumor cells in breast cancer", Nature: Scientific Reports, 2017.

* cited by examiner

MULTIPLEXED AMPLITUDE MODULATION PHOTOMETER AND PERFORMING MULTIPLEXED AMPLITUDE MODULATION PHOTOMETRY

CROSS REFERENCE TO RELATED APPLICATIONS

This application is a continuation-in-part of U.S. patent application Ser. No. 15/967,966, filed May 1, 2018, which claims the benefit of U.S. Provisional Patent Application Ser. No. 62/576,709 filed Oct. 25, 2017, the disclosures of each of which are incorporated herein by reference in their entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, MD, 20899; voice (301) 301-975-2573; email tpo@nist.gov; reference NIST Docket Number 20-037CIP1.

BRIEF DESCRIPTION

Disclosed is a multiplexed amplitude modulation photometer for performing multiplexed amplitude modulation photometry, the multiplexed amplitude modulation photometer comprising: a substrate in which is disposed a microchannel that receives a liquid comprising a first analyte and a second analyte, the microchannel comprising a fluid receiver that is disposed at a first terminus of the liquid, receives the liquid, and flows the liquid to a fluid member that is interposed between the fluid receiver and a fluid transmitter that is disposed at a second terminus of the microchannel; a first input light path disposed in the substrate and that: receives a first modulated light that comprises a first modulation frequency; and communicates the first modulated light to a first optical region of the microchannel that receives the first analyte such that the first analyte produces a first output light from the first modulated light, the first output light comprising the first modulation frequency that is communicated to a first detection light path; the first optical region in optical communication with the first input light path and the first detection light path and in fluid communication with the fluid receiver; the first detection light path disposed in the substrate and that receives the first output light from the first optical region; a second input light path disposed in the substrate and that: receives a second modulated light that comprises a second modulation frequency; and communicates the second modulated light to a second optical region of the microchannel that receives the second analyte such that the second analyte produces a second output light from the second modulated light, the second output light comprising the second modulation frequency that is communicated to a second detection light path; the second optical region in optical communication with the second input light path and the second detection light path and in fluid communication with the fluid receiver such that the second optical region is spaced apart from the first optical region in the microchannel; and the second detection light path disposed in the substrate and that receives the second output light from the second optical region.

Disclosed is a process for performing multiplexed amplitude modulation photometry, the process comprising: introducing a first analyte in a first optical region; subjecting the first analyte to a first modulated light, the first modulated light comprising a first wavelength that is modulated at a first modulation frequency; producing, from the first analyte, first output light in response to subjecting the first analyte to the first modulated light, the first output light modulated at the first modulation frequency; propagating the first output light to an optical detector from the first optical region; receiving, by the optical detector, the first output light; introducing a second analyte in a second optical region, the second optical region separated from the first optical region; subjecting the second analyte to a second modulated light, the second modulated light comprising a second wavelength that is modulated at a second modulation frequency, the second modulation frequency being different than the first modulation frequency; producing, from the second analyte, second output light in response to subjecting the second analyte to the second modulated light, the second output light modulated at the second modulation frequency; propagating the second output light to the optical detector from the second optical region; receiving, by the optical detector, the second output light; producing, by the optical detector, a multiplexed amplitude modulation signal from the first output light and the second output light; and determining, from the multiplexed amplitude modulation signal, a first amount c1 of the first analyte in the first optical region subjected to the first modulated light and a second amount c2 of the second analyte in the second optical region subjected to the second modulated light to perform multiplexed amplitude modulation photometry.

BRIEF DESCRIPTION OF THE DRAWINGS

The following description should not be considered limiting in any way. With reference to the accompanying drawings, like elements are numbered alike.

FIG. 3 shows: (A) an end view and (B) a side view of the multiplexed amplitude modulation photometer shown in FIG. 1;

FIG. 8 shows: (A) a graph of fluorescence versus time, (B) a graph of amplitude versus mode number, (C) a graph of fluorescence versus time, and (D) a graph of normalized relative error versus time, wherein data show multiplexing and signal recovery following measurement of a fluorescent bead crossing a single measurement point illuminated by 2 coincident lasers whose amplitudes were oscillating at different frequencies. (A): raw signal with a 20 kHz and 16 kHz carrier signal illuminating the same interrogation region. The AD and DC components of the amplitude, as well as their sums, are shown by different curves. (B): Power spectrum of the raw data. The largest two peaks correspond to the carrier signal frequencies. (C): superimposed signals after demodulation and scaling. The close agreement between measurements show demodulation extracted the signal from each carrier. (D): Point-wise errors in the demodulated signals relative to the mean signal.

DETAILED DESCRIPTION

A detailed description of one or more embodiments is presented herein by way of exemplification and not limitation.

Improving accuracy of cytometers is challenging because optical configuration, flow control methods, and calibration issues make it difficult to characterize geometric factors associated with signal collection. It has been discovered that a multiplexed amplitude modulation photometer herein overcomes these issues. Conventional devices collect a small solid angle of emitted light, so that minor variations in the aforementioned factors yield large uncertainties in fluorophore count. Such uncertainties can be difficult to quantify with conventional devices because measurement cannot be repeated at the same time with conventional devices or in the same location in the conventional device. The multiplexed amplitude modulation photometer solves both problems by multiplexing optical (e.g., fluorescence) signals in a frequency domain and provides for a single optical detector to simultaneously detect many independent optical (e.g., fluorescence) signals originating at the same or different locations in the multiplexed amplitude modulation photometer. With the multiplexed amplitude modulation photometer, precise alignment or calibration is significantly reduced over conventional devices so that the multiplexed amplitude modulation photometer decreasing corresponding uncertainties. Moreover, the multiplexed amplitude modulation photometer can include a size of detector that increases the magnitude of collected signal to nearly its theoretical maximum and reduces effects of noise. AC and DC components of each signal can be separated to yield multiple measurements of any given object that produces the optical signal. Conventional devices such as cytometers collect a small solid angle (e.g., 5% or less) of available optical signal with a relative uncertainty of 25% or more without ability to repeat measurements, and such limitations are overcome by the multiplexed amplitude modulation photometer.

The multiplexed amplitude modulation photometer is part of the NIST on a Chip program, which is creating portable, SI-traceable measurement devices that can be used directly on factory floors, in hospital diagnostic centers, and the like. These NIST-pioneered technologies will be manufactured and distributed by the private sector, opening new tech-transfer and lab-to-market opportunities in accordance with NIST's goal of supporting advanced manufacturing. In the multiplexed amplitude modulation photometer, volumetric flow and flow velocity are traceable to a dimension of microchannels and waveguide spacing (meter) and timing of light activation pulses and power measurements (second). The multiplexed amplitude modulation photometer can be used in an absence of a microscope. Moreover, determination of flow rate with the multiplexed amplitude modulation photometer can be continuously monitored by recording the amount of light given off by a contrast agent with respect to a maximum amount of light or repeated, e.g., by pulsing the laser power or using a waveform and measuring a time-of-flight or swept volume from an activation to a measurement point. Optical waveguides can be hard-wired onto a chip such that operation of the multiplexed amplitude modulation photometer is independent of laser positioning, focusing, or alignment of the laser and laser light.

The multiplexed amplitude modulation photometer can perform photometry such as multiplexed amplitude modulation fluorometry by signal generation, acquisition, and analysis that simultaneously detect and distinguish fluorophores contained on or in many distinct analytes separated in space or wavelength. Information about the location of the analyte producing the optical signal is encoded in a carrier frequency that generates the optical signal, and the amplitude of the optical signal encodes an actual measurement signal. As a result, an optical detector collects signals from separate optical regions of the multiplexed amplitude modulation photometer at the same time and without interference. In this manner, the multiplexed amplitude modulation photometer reduces or eliminates errors due to misalignment of optical detectors or unknown geometric factors. For a single modulated source, the AC and DC components of the optical signal carry the same information so that the multiplexed amplitude modulation photometry performs repeat measurements at the same location and time. The multiplexed amplitude modulation photometer provides reproducibility and reduces complexity of device design such as a number of detectors or geometric factors associated with detectors, e.g., to provide an improved quality or accuracy of biomedical research tools such as a flow cytometer.

The multiplexed amplitude modulation photometer can perform multiplex fluorescence measurements by binding them to different carrier signals that are superimposed to create a single optical signal that includes all the information. The carrier signals (also referred to as channels) are generated, e.g., by oscillating intensities of multiple light sources at different frequencies. Fluorescent dyes, beads, or cells exposed to such a light source are induced to fluoresce with an intensity that has the same frequency as the corresponding carrier signal and an amplitude proportional to the number of fluorophores illuminated. The resulting optical signal is a modulated version of the carrier signal transformed into the color of the fluorescent light, wherein the amplitude has the information about the measurement. It should be appreciated that multiplexed amplitude modulation photometry combines signals from multiple channels or interrogation optical regions that are separated in space (e.g., all optical signals can be received by the same optical detector on different location of the optical detector or using waveguide combiners to combine optical signals into a single light beam that is received by the optical detector) to create (from all of the optical signals) a single superimposed electrical signal referred to as a multiplexed amplitude modulation signal. The multiplexed amplitude modulation signal can be demodulated to separate amplitudes associated with each optical signal from each channel to obtain the individual measurements, e.g., of concentration of the analyte that produced the optical signal. A multiplexing approach using a pair of sufficiently-sized (e.g., disk-shaped) optical detectors sandwiching the interrogation region can collect almost all of the light from each analyte irrespective of their exact locations when the analytes are within a solid angle of photon collection of the optical detectors. Such optical signal detection facilitates standardization and uniformity of measurements for high-accuracy fluorophore counting. The multiplexed amplitude modulation photometer extracts multiple measurements of the same analyte separately from the DC or AC component of the amplitude modulated signal and provides repeat measurements at the same time and location that facilitates uncertainty quantification.

Multiplexed amplitude modulation photometer 200 performs multiplexed amplitude modulation photometry. In an embodiment, with reference to FIG. 1, FIG. 2, FIG. 3, and FIG. 6, multiplexed amplitude modulation photometer 200 includes: substrate 212 and microchannel 213 disposed in substrate 212. Microchannel 213 includes fluid receiver 214 that receives liquid 215 including analyte 201; fluid transmitter 216 that receives liquid 215 from fluid receiver 214; and fluid member 217 interposed between fluid receiver 214 and fluid transmitter 216. Fluid member 217 includes first optical region 202.1 that receives first modulated light 203.1 and communicates first output light 204.1 out of fluid member 217. Microchannel 213 is bounded by substrate 212. Further, fluid member 217 communicates liquid 215 from fluid receiver 214 to fluid transmitter 216. Additionally, multiplexed amplitude modulation photometer 200 includes first input light path 218.1 disposed in substrate 212 and arranged at an oblique angle or right angle to fluid member 217 proximate to first optical region 202.1. First input light path 218.1 receives first modulated light 203.1 from first light source 219.1 and communicates first modulated light 203.1 to first optical region 202.1, wherein first modulated light 203.1 interacts with first analyte 201.1 in first optical region 202.1 and produces first output light 204.1 from first analyte 201.1 in response to interaction of first analyte 201.1 with first modulated light 203.1 in first optical region 202.1. First output light 204.1 is communicated through first detection light path 220.1 disposed in substrate 212. First detection light path 220.1 is arranged at an oblique angle or right angle to fluid member 217 proximate to first optical region 202.1 and receives first output light 204.1 from first optical region 202.1 and communicates first output light 204.1 from microchannel 213 to optical detector 205. Multiplexed amplitude modulation photometer 200 also includes second input light path 218.2 disposed in substrate 212 and that: receives second modulated light 203.2 that includes second modulation frequency 210.2; and communicates second modulated light 203.2 to second optical region 202.2 of microchannel 213 that receives second analyte 201.2 such that second analyte 201.2 produces second output light 204.2 from second modulated light 203.2, second output light 204.2 including second modulation frequency 210.2 that is communicated to second detection light path 220.2; second optical region 202.2 in optical communication with second input light path 218.2 and second detection light path 220.2 and in fluid communication with fluid receiver 214 such that second optical region 202.2 is spaced apart from first optical region 202.1 in microchannel 213; and second detection light path 220.2 disposed in substrate 212 and that receives second output light 204.2 from second optical region 202.2.

Multiplexed amplitude modulation photometer 200 can include flow controller 221 in fluid communication with microchannel 213 to communicate liquid 215 to fluid receiver 214. Multiplexed amplitude modulation photometer 200 further can include first light source 219.1 in optical communication with first input light path 218.1 to provide first modulated light 203.1 to the first input light path 218.1. Second light source 219.2 can be in optical communication with second input light path 218.2 to provide second modulated light 203.2 to second input light path 218.2.

Multiplexed amplitude modulation photometer 200 can include detection light path 220 proximate to input light path 218, a plurality of detection light paths 220 disposed proximate to and about input light path 218, detection light path 220 disposed opposing input light path 218, or a combination thereof such that detection light path 220 receives output light 204 and transmit output light 204 to optical detector 205. It is contemplated that interaction of modulated light 203 with optical region 202 produces output light 204. Accordingly, output light 204 can be scattered or emitted from optical region 202 and received by optical detector 205 via detection light path 220 as output light 204. A number of detection light paths 204 and their position relative to microchannel 213 and input light path 218 (e.g., first input light path 218.1 or second input light path 218.2) is arbitrary and can be selected to acquire substantially all output light 204 (e.g., first output light 204.1 or second output light 204.2) from optical region 202 (e.g., first optical region 202.1 or second optical region 202.2).

In an embodiment, first input light path 218.1 and second input light path 218.2 independently include a waveguide. In an embodiment, first detection light path 220.1 and second detection light path 220.2 independently include a waveguide.

A number of optical detectors 205 and their position relative to microchannel 213 and detection light path 220 (e.g., first detection light path 220.1 or second detection light path 220.2) is arbitrary and can be selected to acquire substantially all output light 204 (e.g., first output light 204.1 or second output light 204.2) from detection light path 220 (e.g., first detection light path 220.1 or second detection light path 220.2). In an embodiment, with respect to FIG. 4, single optical detector 205 is disposed on substrate 212, receives first output light 204.1 that propagates from first analyte 201.1 in first optical region 202.1 via first detection light path 220.1, and receives second output light 204.2 from second analyte 201.1 in second optical region 202.2 via second detection light path 220.2, wherein first output light 204.1 and second output light 204.1 are received on optical detector 205 in substantially the same location of optical detector 205. It should be appreciated that with regard to FIG. 2, although drawn as separate detectors for convenience of illustration, such optical detectors can be a single optical detector 205.

Figure 5:
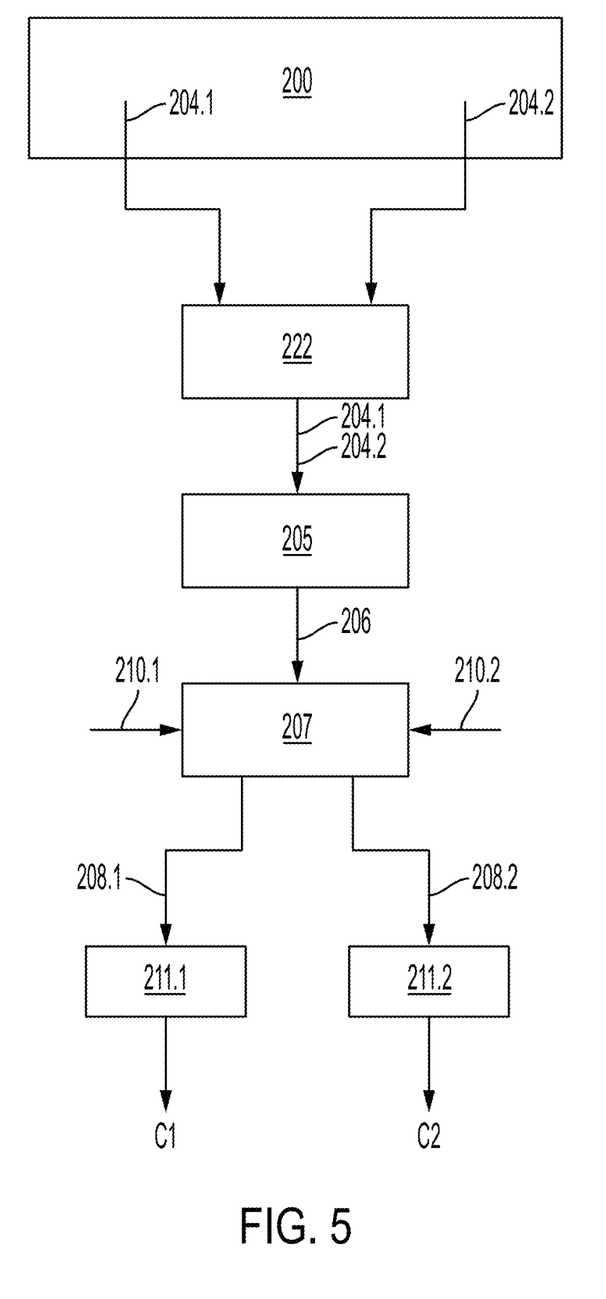
FIG. 5 shows a multiplexed amplitude modulation photometer.

In an embodiment, with reference to FIG. 5, multiplexed amplitude modulation photometer 200 includes beam combiner 222 in optical communication with first detection light path 220.1 and second detection light path 220.1 and that receives first output light 204.1 from first detection light path 220.1 and receives second output light 204.2 from second detection light path 220.1. Beam combiner 222 optically combines first output light 204.1 and second output light 204.2 into a single optical light beam that is communicated to optical detector 205 so that optical detector 205 receives the single optical light beam at a single spot.

Figure 1:
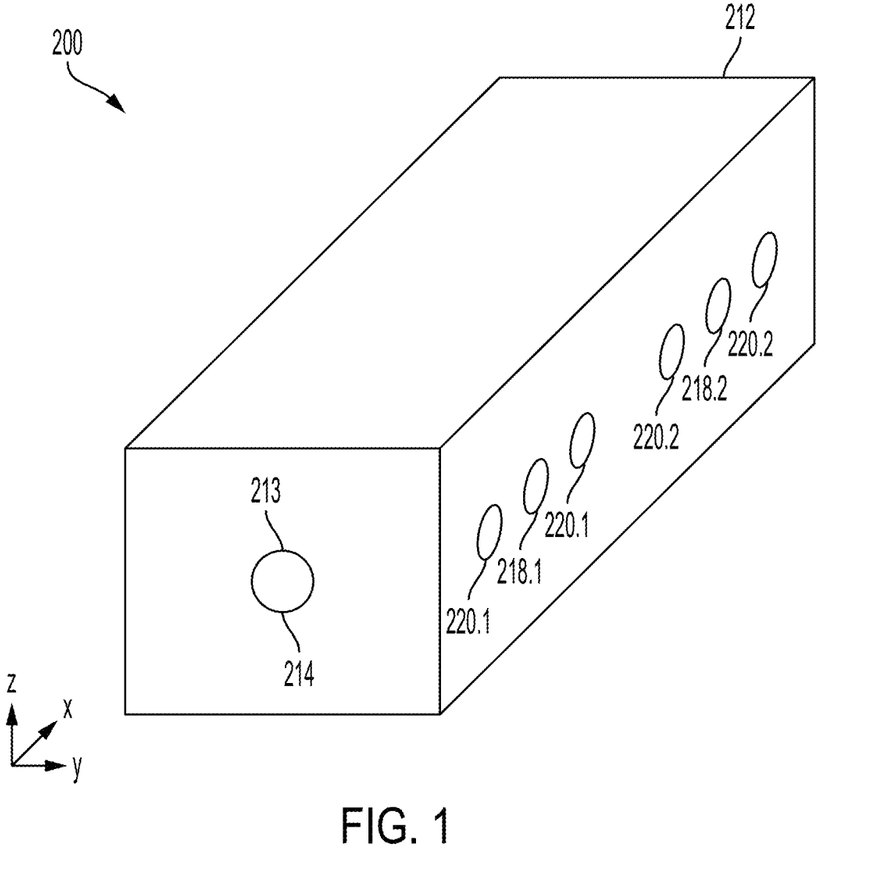
FIG. 1 shows a perspective view of a multiplexed amplitude modulation photometer.
Figure 2:
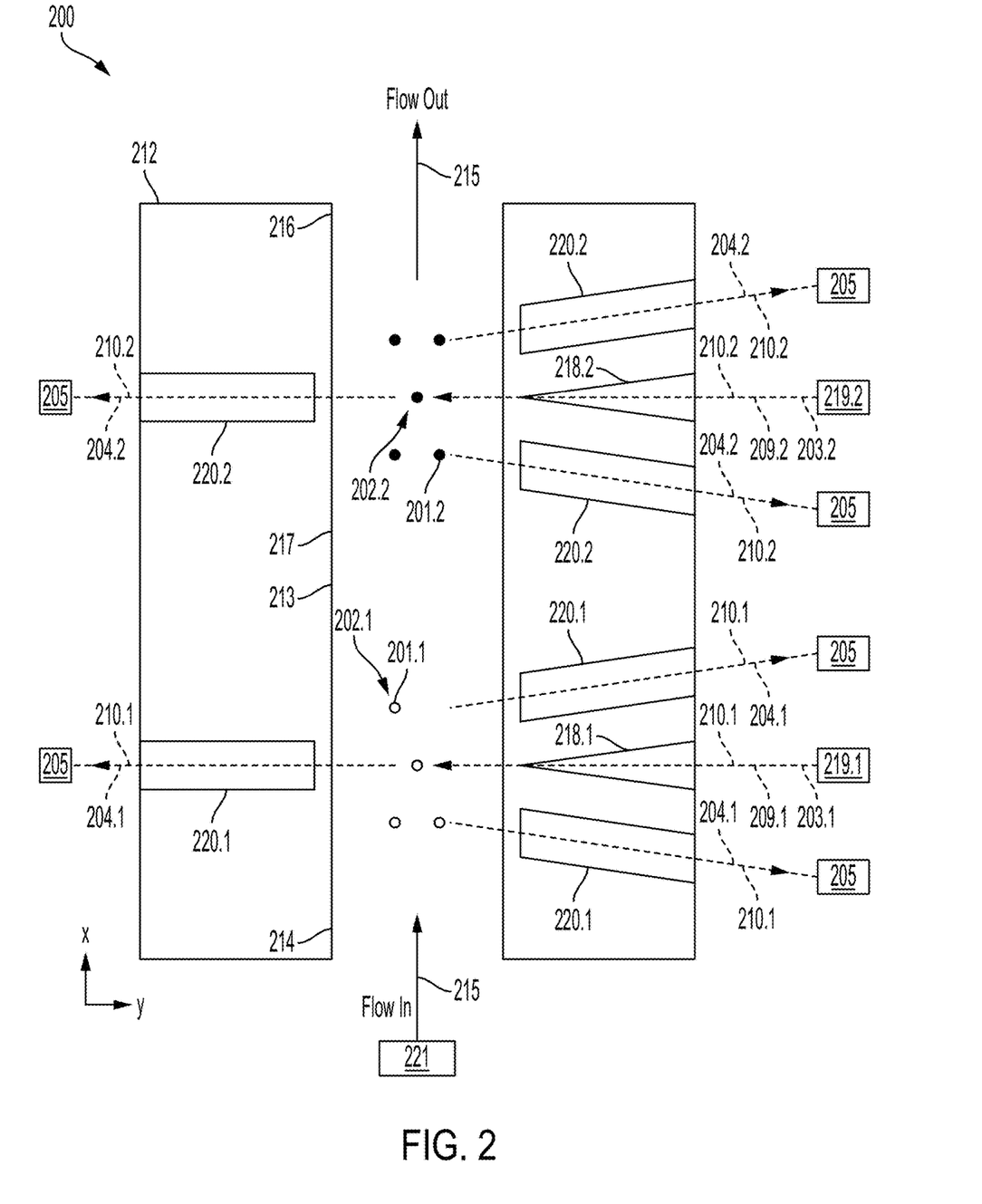
FIG. 2 shows a cross-sectional view of the multiplexed amplitude modulation photometer shown in FIG. 1.
Figure 3A:
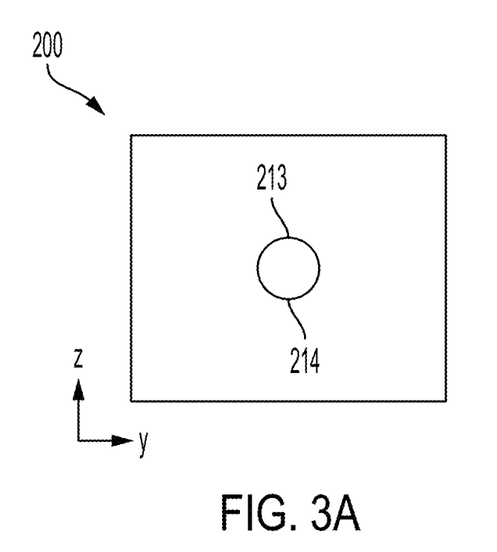
Figure 3B:
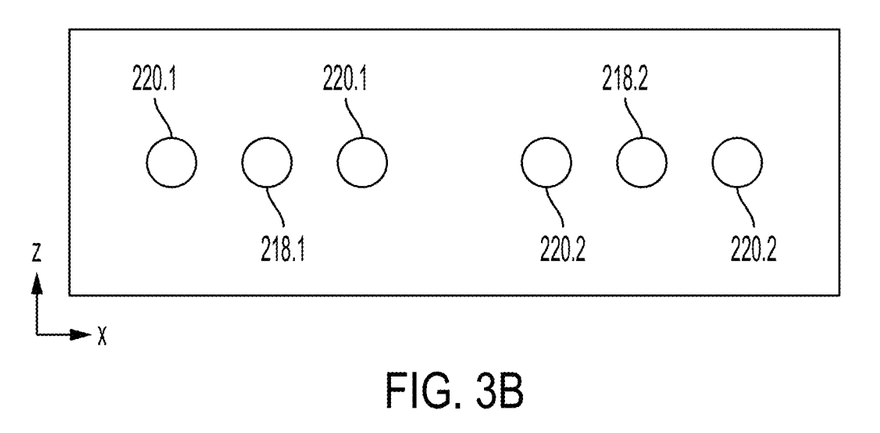
Figure 4:
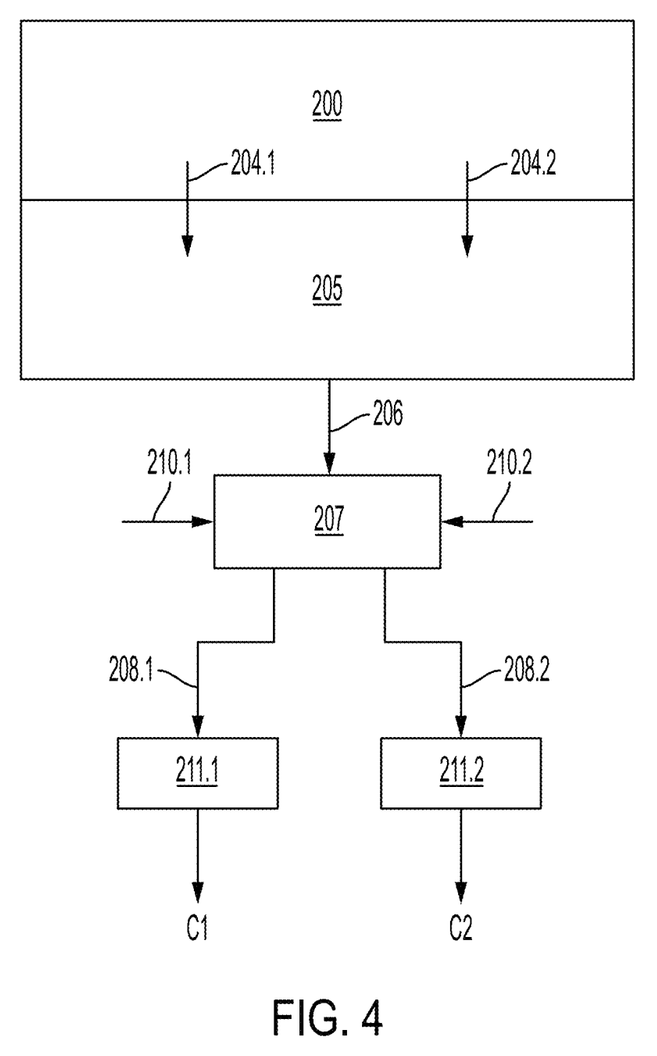
FIG. 4 shows a multiplexed amplitude modulation photometer.

In an embodiment, with reference to FIG. 4 and FIG. 5, optical detector 205 receives first output light 204.1 and second output light 204.2 and produces multiplexed amplitude modulation signal 206 from first output light 204.1 and second output light 204.2 by converting the optical signals (output light 204) into an electrical signal (multiplexed amplitude modulation signal 206). Demodulator 207 is in electrical communication with optical detector 205, receives multiplexed amplitude modulation signal 206 from optical detector 205, receives first modulation frequency 210.1 (e.g., from first light source 219.1 or a driver that drives first light source 219.1 at first modulation frequency 210.1), receives second modulation frequency 210.2 (e.g., from second light source 219.2 or a driver that drives second light source 219.2 at second modulation frequency 210.2), produces first demodulated signal 208.1 from multiplexed amplitude modulation signal 206 and first demodulated signal 208.1, and produces second demodulated signal 208.2 from multiplexed amplitude modulation signal 206 and second demodulated signal 208.2.

Substrate 212 of multiplexed amplitude modulation photometer 200 can include a material that provides flow in microchannel 213. Moreover, substrate 212 can be disposed in or can include a microfluidic device. Exemplary materials for substrate 212 include a polymer such as an elastomer (e.g., PDMS), epoxy, adhesive (e.g., an adhesive tape, photocurable adhesive, and the like), acrylic (e.g., PMMA), polycarbonate, polystyrene, polyester, polypropylene, cyclic olefin copolymer, hard material (e.g., a glass, semiconductor (e.g., pure and doped silicon), or metal (e.g., aluminum)). Substrate 212 can include a combination of transparent, opaque, or reflective boundaries to control light propagation in or through an interior of multiplexed amplitude modulation photometer 200. In an embodiment, substrate 212 includes a structure to absorb, scatter, or reflect light out of the optical paths or to prevent cross-talk between light paths.

Substrate 212 include microchannel 213 that can be formed in a curable polymer such as PDMS cast from a photoresist pattern provided in a photolithographic process. In an embodiment, microchannel 213 is formed by laser oblation or chemical etching of a material such as glass. Forming microchannel 213 can occur by milling, cutting, embossing, and the like. Printing, e.g., 3D printing of substrate 212 can form microchannel 213 or other structural element of multiplexed amplitude modulation photometer 200.

Dimensions of microchannel 213 are selected based, e.g., on a type of flow through multiplexed amplitude modulation photometer 200, analyte 201, or optical detector 205. Dimensions such as width (W) or height (H) of microchannel 213 (in direction X or Z) can be from 10 nm to 1 mm, specifically from 1 micrometer to 500 micrometers for water. Dimensions can depend on speed of fluid through multiplexed amplitude modulation photometer 200 or pressure on liquid 215. A shape of microchannel 213 can be, e.g., rectangular, circular, or a combination thereof, can have a uniform or non-uniform cross section, or can be confined to a linear configuration or fixed within a single plane along its length. For example, microchannel 213 can include a wall that bounds microchannel 213 and that can curve, bend, or split or can include a junction to direct liquid 215 in multiplexed amplitude modulation photometer 200. A length (L) of microchannel 213 can be selected based on the size of optical region 202 and that provides selected convective or diffusion of liquid 215 between optical regions 202. The length of microchannel 213 can be from 1 micrometer to 1 meter, and specifically from 100 micrometers to 20 centimeters. In an embodiment, microchannel 213 has a rectangular cross section and has width and height that are independently 125 micrometers. In another embodiment, microchannel 213 has a rectangular cross section and has width and height that are 40 micrometers and 80 micrometers, respectively. In an embodiment, microchannel 213 is a glass capillary that has an internal diameter of 150 micrometers.

In multiplexed amplitude modulation photometer 200, fluid receiver 214 and fluid transmitter 216 connect multiplexed amplitude modulation photometer 200 to an external source of fluid (such as liquid 215 from flow controller 221) or sinks, respectively, or to fluid transmitter 216 or fluid receiver 214 from another multiplexed amplitude modulation photometer 200, respectively. Fluid receiver 214 and fluid transmitter 216 can provide smooth transition to microchannel 213 and can have similar cross-sectional dimensions. Moreover, fluid receiver 214 or fluid transmitter 216 can include a seal or a mechanical device so that liquid 215 is unidirectionally flowed from fluid receiver 214 to fluid transmitter 216 in microchannel 213. Additionally, fluid transmitter 216 can include valves or bifurcations to control liquid flow in microchannel 213.

Liquid 215 flows through microchannel 213. It is contemplated that liquid 215 can include includes gas, miscible or immiscible liquid components, solid particles, compounds, or small molecules disposed in liquid 215. Exemplary liquid 215 includes water, bodily fluid, organic solvent such as alcohols and fuels, and the like. Solid particles, compounds, and small molecules can include chemical compounds that absorb, scatter, or emit light such as fluorescent dyes, inorganic or organic microparticles or nanoparticles, biological materials such as proteins and protein aggregates, lipid vesicles, exosomes, organelles, and cells. Moreover, liquid 215 can include a combination of different constituents.

Depending on substrate 212, liquid 215, or dimensions of microchannel 213, a pressure of liquid 215 in microchannel 213 can be from 0 Pascals (Pa) to 700 kPa, specifically from 0 Pa to 130 kPa, and more specifically from 0 Pa to 70 kPa. A viscosity of liquid 215 can be from $1\times10^{-6}$ to 1 Pa·s, specifically from $10\times10^{-6}$ to 0.1 Pa·s, and more specifically from $1\times10^{-4}$ to 0.01 Pa·s. Flow can be unidirectional, and pressure can be positive. With respect to FIG. 1 to FIG. 3 and FIG. 6, multiplexed amplitude modulation photometer 200 performs multiplexed amplitude modulation photometry similarly with flow in either direction of liquid 215 in microchannel 213.

In multiplexed amplitude modulation photometer 200, analyte 201 (e.g., analyte 201.1, analyte 201.2) independently can include reflective, absorptive, fluorescent, reactive, or optically active particles that permit contrast in the presence of light. Analyte 201 independently can include, e.g., fluorescein and derivatives thereof. Specifically, a derivative could be fluorescein-conjugated antibodies, calcium-reactive dyes, pH sensing dyes, enzyme-activatable fluorophores or caged compounds, and the like. Analyte 201 independently can be selected based on the wavelength of modulated light 203 (e.g., 203.1, 203.2). Analyte 201 can be selected, independently, based on its diffusion coefficient, absorbance, or emission spectra. Analyte 201 excitation, bleaching, or emission wavelengths independently can be from 240 nm and 1000 nm, specifically from 350 nm and 800 nm.

In multiplexed amplitude modulation photometer 200, input light path 218 can be disposed in substrate 212 as a microchannel, e.g., a void in substrate 212. Input light path 218 can be in optical communication with light source 219 by an optical fiber or along light paths as modulated light 203 propagates. Input light path 218 can include a bifurcation or optical element that changes a direction, intensity, or spectrum of modulated light 203 along input light path 218.

In multiplexed amplitude modulation photometer 200, light source 219 can include light-emitting diodes or lasers to emit light at a desired wavelength. The properties of light source 219 and its type can be selected based on the packaging of multiplexed amplitude modulation photometer 200, level of interaction with analyte 201, or transmission of light by input light path 218.

In multiplexed amplitude modulation photometer 200, modulated light 203 can induce fluorescence, scatter, or absorption in analyte 201 in optical region 202. In an embodiment, analyte 201 includes fluorescein as a fluorescent tag. Modulated light 203 can be selected based on interaction with analyte 201 and can have wavelength 209 from 240 nm to 1000 nm, more specifically from 350 nm to 800 nm. In an embodiment, wavelength 209 of modulated light 203 is from 450 nm to 500 nm. In an embodiment, wavelength 209 is from 470 nm to 490 nm. An intensity of modulated light 203 is selected based on interrogation of analyte 201, nature of the flow of liquid 215, and desired characteristics of output light 204. The intensity of modulated light 203 can be from 1 nanowatt (nW) to 1 W. In an embodiment, the intensity of modulated light 203 can be from 1 microwatt to 200 mW. Modulation frequency 210 (e.g., first modulation frequency 210.1 and second modulation frequency 210.1) of modulated light 203 (e.g., first modulated light 203.1 and second modulated light 203.2) independently can be from 1 Hz to 300 GHz, specifically from 1 kHz to 100 MHz, and more specifically from 100 kHz to 20 MHz.

In multiplexed amplitude modulation photometer 200, input light path 218 transmits modulated light 203 from light source 219 to optical region 202. Moreover, input light path 218 can include a filter or bifurcation to reduce the intensity of modulated light 203 or direct part of modulated light 203 to a light intensity meter. In an embodiment, input light path 218 includes a waveguide filled with optical material that permits total internal reflection of light. In an embodiment, the optical material is a photocurable adhesive that has a higher index of refraction than substrate 212. In an embodiment, input light path 218 has a curved end to shape the light in optical region 202. In an embodiment, modulated light 203 is approximately uniform intensity across modulated light 203.

In multiplexed amplitude modulation photometer 200, optical region 202 is where modulated light 203 interacts with analyte 201 to induce fluorescence, bleaching, scatter, or absorption by analyte 201 and from which output light 204 initially propagates out of microchannel 213. In an embodiment, modulated light 203 induces analyte 201 to emit fluorescence. In an embodiment, modulated light 203 causes some of analyte 201 to emit fluorescent light as output light 204 and some of analyte 201 to bleach (e.g., be destroyed by analyte 201 and stop emitting fluorescence). The intensity of modulated light 203 with the amount of time analyte 201 spends in optical region 202 (e.g., the speed of analyte 201) can determine an amount of bleaching versus emitted fluorescence or other type of production of output light 204.

In multiplexed amplitude modulation photometer 200, detection light path 220 communicates output light 204 from optical region 202. Detection light path 220 can include filters or bifurcations to reduce the intensity of light or direct part of output light 204 to a light intensity meter or spectrometer. In an embodiment, detection light path 220 is a waveguide filled with optical material that permits total internal refection of light. In an embodiment, the optical material is a photocurable adhesive that has a higher index of refraction than substrate 212. In an embodiment, detection light path 220 includes a lens element to focus light into detection light path 220 and is slightly wider than input light path 218 in order to capture more output light 204 from optical region 202.

In multiplexed amplitude modulation photometer 200, output light 204 can be fluorescence, scattered light, or a change in transmission of modulated light 203 to become output light 204 resulting from interaction of modulated light 203 with analyte 201 in optical region 202. In an embodiment, output light 204 is emitted light from a fluorescent tag in analyte 201. In an embodiment, output light 204 is loss of fluorescence due to photobleaching of analyte 201. Output light 204 can be modified by components of detection light path 220 and can have a wavelength from 240 nm to 1000 nm, and specifically from 350 nm to 800 nm.

In multiplexed amplitude modulation photometer 200, optical detector 205 records properties of output light 204. In an embodiment, optical detector 205 is connected to detection light path 220 by an optical fiber. In an embodiment, the optical fiber is a 125-micrometer diameter multimode fiber that carries a visible wavelength of light. In an embodiment, optical detector 205 is a broadband photodiode connected to a power meter. In an embodiment, optical detector 205 has a spectral range from 200 nm to 1100 nm. In an embodiment, optical detector 205 is preceded by an optical filter that excludes modulated light 203 to enhance collection of emitted fluorescence light as output light 204 over modulated light 203. In an embodiment, the filter blocks wavelengths outside the range from 510 nm to 530 nm, allowing only fluorescence emitted from fluorescein to reach the detector. In an embodiment, the filter includes multiple spectral bandpass regions to enable multiple fluorescent signals to be passed while excluding their respective excitation wavelengths. In an embodiment, the optical detector 205 includes an amplifier to further amplify the electronic signal of the modulated light 203.

It is contemplated that output light 204 can have a same wavelength as output light 204 such that detection light path 220 is offset from input light path 218 to avoid direct detection of modulated light 203 by output light 204. In an embodiment, optical detector 205 is a spectrometer that measures a spectrum of output light 204. Optical detector 205 can be a photodiode, photomultiplier tube, or the like integrated in multiplexed amplitude modulation photometer 200 or interfaced with substrate 212. It is contemplated that optical detector 205 is in direct optical communication with detection light path 220 without intervening components therebetween. In an embodiment, first optical detector 205.1 is disposed on a first side of substrate 212, and second optical detector 205.2 is disposed on an opposing side of substrate 212 so that substrate 212 is interposed between first optical detector 205.1 and second optical detector 205.2.

In an embodiment, microchannel 213 is optionally connected to flow controller 221 that serves to flow liquid 215 and analyte 201 through microchannel 213. In an embodiment, flow controller 221 is a syringe pump that delivers volumetric flow from 100 picoliter per minute (pL/min) to 100 microliters/min. In an embodiment, flow controller 221 is a vessel filled with fluid at a fixed height above fluid transmitter 216 of microchannel 213. Gravity can control pressure on liquid 215 and drive the flow rate as a function of fluidic resistance through microchannel 213. In an embodiment, external pressure is applied to the fluid-filled vessel in order to provide a selected pressure drop. Exemplary flow controller 221 include peristaltic and rotary pumps, piston pumps, diaphragm pumps, and the like.

The optical filter can be an optical bandpass filter that transmits a selected wavelength or range of wavelengths (e.g., fluorescence emission) while blocking other wavelengths (e.g., fluorescence excitation or other background sources of light). The optical filter can include a selected number of bandpass regions (e.g., 1, 2, 3, or more) to enable simultaneous transmission and rejection of excitation wavelengths of fluorescent species.

In an embodiment, with reference to FIG. 5, beam combiner 222 is optically interposed between detection light path 220 and optical detector 205 to receive first output light 204.1 and second output light 204.2, combine first output light 204.1 and second output light 204.2 into a single beam of output light 204, and communicate the single beam of to. Exemplary beam combiners 222 include fiber optic couplers, prisms and mirrors, dichroic combiners, and the like.

In an embodiment, demodulator 207 receives multiplexed amplitude modulation signal 206 from optical detector 205. Demodulator 207 deconvolves multiplexed amplitude modulation signal 206 into first demodulated signal 208.1 and first demodulated signal 208.2 that respectively correspond to first output light 204.1 and second output light 204.2. Demodulator 207 receives first modulation frequency 210.1 and second modulation frequency 210.2 for deconvolution. Demodulator 207 can be, e.g. a phase sensitive detector such a lock-in detector.

First demodulated signal 208.1 is subjected to first frequency filter 211.1 to produce first amount c1 of first analyte 201.1 in first optical region 202.1. Second demodulated signal 208.2 is subjected to second frequency filter 211.2 to produce second amount c2 of second analyte 201.2 in second optical region 202.2. Frequency filters 211 (e.g., first 0.1, second frequency filter 211.2) independently can be a digital or analog filter that can be implemented in hardware or software. Exemplary frequency filter 211 includes a transcendental function such as an exponential function, logarithm, trigonometric function, and the like and can include a particular frequency and time element such as sin(w*t), wherein w is a frequency, and t is time.

In an embodiment, demodulator 207 includes an analog to digital converter such as a digitizer can provide data to a computer and can include a functionality that can be provided by software to produce values for amounts c1 and c2 from demodulated signal 208.1 and 208.2 using modulation frequencies 210.1 and 210.2, respectively. In an embodiment, the analog-to-digital converter has 16 bits resolution and 2GS/s sampling rate.

In an embodiment, modulation frequency 210 is produced by a signal generator that produces output voltage sine waves from 0 to 1 V over frequencies from 1 Hz to 100 MHz. In an embodiment, the signal generator is in communication with the demodulator 207. In an embodiment, the signal generator communicates modulation frequency to a laser that can control output power from 0 to 200 mW continuously or with up to 150 MHz analog modulation.

Multiplexed amplitude modulation photometer 200 can be made in various ways. In an embodiment, a process for making multiplexed amplitude modulation photometer 200 includes defining a microchannel and waveguides in a substrate. The process for defining these features can involve subtractive manufacturing (e.g., laser ablation, engraving, cutting, etching, etc.) or additive manufacturing (e.g., 3D printing, controlled deposition, templated substrate growth, and the like) or photolithography to define topographic features that become or will be used to produce constituent elements of the multiplexed amplitude modulate photometer 200, such as the microchannel 213 and waveguides for input light 218 and detection light 220. In an embodiment, topographic features were produced on silicon wafers using photolithography. A negative photoresist polymer (e.g., SU8) was used as the photosensitive polymer to produce the topographic patterns on a silicon wafer. In an embodiment, the SU8 features were approximately the same height as an optical fiber diameter. Alternative methods to produce topographic features that can include milling and embossing of metals or plastics or etching materials such as glass and silicon. Topographic features are typically treated with a non-stick material such as a silane to facilitate removal of substrates after casting.

In an embodiment, features in substrate 212 are produced by casting and curing a liquid material such as poly(dimethylsiloxane) (PDMS) against the topographic features. Other exemplary casting materials include epoxy, adhesives or curable polymers or melts. Alternative means of fabricating a substrate in the milli or micro or nanoscale size range include 3D printing, cutting, milling, laser writing, and embossing.

In an embodiment, a first substrate is bonded to a second substrate so as to form a bottom of channel features and to form open-ended microchannels that include microchannel 213, input light path 218, and detection light path 220. In an embodiment, substrate 212 is bonded to a flat surface of the same material as the cast substrate so that the index of refraction of the material is the same around the exterior of input light path 218 and detection light path 220. In an embodiment, substrate 212 and the flat surface were both made of PDMS and bonded by oxygen plasma treatment of both layers prior to placing them together. In another embodiment, the PDMS layers are bonded together using a layer of liquid PDMS between the layers to promote bond following heat treatment to cure the liquid PDMS. Other methods to form the enclosed channels include using an adhesive such as epoxies, double-sided tape, or a mechanical force provided by a device such as a clamp or vacuum pump.

In an embodiment, input light path 218 and detection light path 220 are filled with an appropriate material such as an optical liquid or adhesive or matching fluid to produce total-internal reflection and carry light along input light path 218 and detection light path 220. Alternatively, input light path 218 and detection light path 220 can be formed by modifying the optical properties of substrate 212, e.g. by chemical, thermal, or optical manipulation, such that these regions become capable of confining and transmitting light as a waveguide. As waveguides, input light path 218 and detection light path 220 deliver modulated light 203 to and collect output light 204 from material in optical region 202 of microchannel 213. In an embodiment, input light path 218 and detection light path 220 are filled with PDMS that has a higher crosslinker ratio (e.g. 1:5). In an embodiment, the material filling input light path 218 and detection light path 220 was a UV curable optical adhesive (e.g., commercially available as Norland Optical Adhesive 88), which has a higher index of refraction compared to PDMS.

In an embodiment, a process for making multiplexed amplitude modulation photometer 200 includes incorporating an optical fiber to communicate modulated light 203 from light source 219 to input light path 218 and communicate output light 204 to optical detector 205 from detection light path 220. In an embodiment, the height of channels for input light path 218 and detection light path 220 were set to match the diameter of bare fiber (e.g., 105 micrometers), and the width at the entrance of the light path channel where the fiber is inserted is set to be a small factor (e.g., 3 times) larger than the diameter of the fiber (roughly 300 micrometers) to facilitate fiber insertion. In an embodiment, the width of the light path channel tapers down to width of the fiber to stop the fiber insertion at a certain point. In an embodiment, the width of the light path was narrowed further (e.g., 50 micrometers wide) to pinpoint the light impinging on the flow member or widened (e.g. 150 um) to collect more light from the flow member. Following insertion of stripped and cleaved optical fibers into input light path 218 and detection light path 220, the coupling fluid was cured with ultraviolet light or heat to lock the fibers in place. In an embodiment, SMA-pigtailed optical fibers were directly connected to lasers fitted with SMA adapters.

Waveguides can be solid, and light can be launched into input light path 218 and detection light path 220 by gluing fibers to the ends of input light path 218 and detection light path 220 or focusing light into input light path 218 and detection light path 220 using optical elements.

Figure 6:
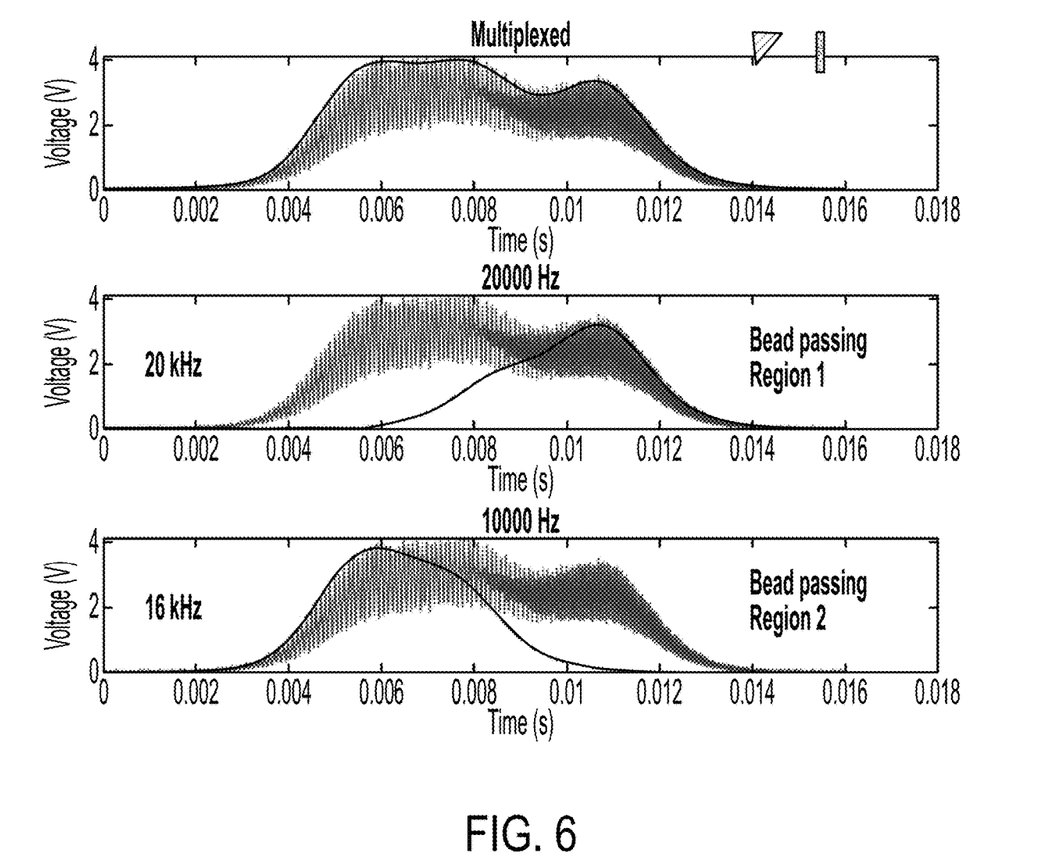
FIG. 6 shows: (A) a graph of voltage versus time for a multiplexed signal, (B) a 20 kHz signal from the multiplexed signal, and (C) a 16 kHz signal from the multiplexed signal, wherein signal demodulation from spatially separated events was collected on a single optical detector. Modulated trace shows measured signal for different beads passing through optical regions 1 and 2 at approximately the same time. Curve line trace shows the low pass filtered envelope. Demultiplexed signal shows the intensity envelope for the bead passing at optical region 1 with laser light modulated at 20 kHz. The lower panel shows demultiplexed signal for the intensity envelope for the bead passing at optical region 2 with laser light modulated at 16 kHz.

In an embodiment, with reference to FIG. 6, light blocking structures are disposed in substrate 212 and light from one path interacting with light from another path. In an embodiment, additional microchannels were placed between light path 218 or light path 220 and filled with an opaque liquid material (e.g., opaque or black PDMS, commercially available from Dow Corning under that tradename Sylgard 170) to prevent light from one feature leaking into and contaminating the light in another feature. The opaque PDMS was cured with heat.

The process for making multiplexed amplitude modulation photometer 200 can include creating ports to deliver fluid to microchannel 203. Creation of ports can involve cutting, boring, milling, etching, and the like. Ports, adapters, or fluid reservoirs can also be glued, clamped or affixed to microchannel 203 to communicate fluids with multiplexed modulation photometer 200. In an embodiment, ports were created by boring or punching a hole through PDMS using a biopsy punch with 750 micrometer diameter. In an embodiment, 21-gauge stainless steel tubing blunted at both ends was inserted into ports to connect to syringe pumps using flexible tubing.

Multiplexed amplitude modulation photometer 200 has numerous advantageous and unexpected benefits and uses. In an embodiment, a process for performing multiplexed amplitude modulation photometry with multiplexed amplitude modulation photometer 200 includes: creating first modulated light 203.1 at first wavelength 209.1 with first modulation frequency 210.1 by a waveform-generator or other frequency source; introducing first analyte 201.1 in first optical region 202.1 by a pump or other flow controller; subjecting first analyte 201.1 to first modulated light 203.1 as it passes through first optical region 202.1; producing, from first analyte 201.1, first output light 204.1, in response to subjecting first analyte 201.1 to first modulated light 203.1, by emission from fluorescent molecules, scattering, or absorption (first output light 204.1 maintains first modulation frequency 210.1); propagating first output light 204.1 to optical detector 205 from first optical region 202.1; receiving, by optical detector 205, first output light 204.1; creating second modulated light 203.2 at second wavelength 209.2 with second modulation frequency 210.2 by a waveform generator or other frequency source; introducing second analyte 201.2 in second optical region 202.2 by a pump or other flow controller; subjecting second analyte 201.2 to second modulated light 203.2 as it passes through second optical region 202.2; producing, from second analyte 201.2, second output light 204.2, in response to subjecting second analyte 201.2 to second modulated light 203.2, by emission from fluorescent molecules, scattering, or absorption (second output light 204.2 maintains second modulation frequency 210.2); propagating second output light 204.2 to optical detector 205 from second optical region 202.2; receiving, by optical detector 205, second output light 204.2; producing, by optical detector 205, multiplexed amplitude modulation signal 206 from first output light 204.1 and second output light 204.1; and determining, from multiplexed amplitude modulation signal 206, first amount c1 of first analyte 201.1 in first optical region 202.1 subjected to first modulated light 203.1 and second amount c2 of second analyte 201.2 in second optical region 202.2 subjected to second modulated light 203.2 by demultiplexing in silico or by hardware, such as a circuit that performs multiplexed amplitude modulation photometry.

The process for performing multiplexed amplitude modulation photometry further can include: receiving, by demodulator 207, multiplexed amplitude modulation signal 206 from optical detector 205 by an electrical wire; deconvolving, by demodulator 207, multiplexed amplitude modulation signal 206 to produce first demodulated signal 208.1 and second demodulated signal 208.2 by a demodulator circuit; subjecting first demodulated signal 208.1 to first frequency filter 211.1 to obtain first amount c1 of first analyte 201.1 by a low-pass, band-pass, or other regularization filter; and subjecting second demodulated signal 208.2 to second frequency filter 211.2 to obtain second amount c2 of second analyte 201.2 by a low-pass, band-pass, or other regularization filter.

In the process for performing multiplexed amplitude modulation photometry, deconvolving multiplexed amplitude modulation signal 206 can include applying $\sin(w1*t)$ to the multiplexed amplitude modulation signal 206 as:

$$[c1(t)*(a1+b1*\sin(w1*t))+c2(t)*(a2+b2*\sin(w2*t))]\\*\sin(w1*t)$$

to produce the first demodulated signal 208.1 by a trigonometric relationship, wherein c1 is first amount c1 of first analyte 201.1; t is time; a1 is the bias or offset of first modulated light 203.1; b1 is amplitude of first modulated light 203.1; w1 is first modulation frequency 210.1; c2 is second amount c2 of second analyte 201.2; a2 is the bias or offset of second modulated light 203.2; b2 is amplitude of second modulated light 203.2; and w2 is second modulation frequency 210.2.

In the process for performing multiplexed amplitude modulation photometry, deconvolving multiplexed amplitude modulation signal 206 can include applying $\sin(w2*t)$ to multiplexed amplitude modulation signal 206 as:

$$[c1(t)*(a1+b1*\sin(w1*t))+c2(t)*(a2+b2*\sin(w2*t))]\\*\sin(w2*t)$$

to produce the second demodulated signal 208.2.

The process for performing multiplexed amplitude modulation photometry further can include receiving, by demodulator 207, first modulation frequency 210.1 of first output light 204.1 through electrical communication of signals, e.g., by coaxial cables.

The process for performing multiplexed amplitude modulation photometry, further can include receiving, by demodulator 207, second modulation frequency 210.2 of second output light 204.2 through electrical communication of signals, e.g., by coaxial cables.

The process for performing multiplexed amplitude modulation photometry, further can include, prior to producing multiplexed amplitude modulation signal 206 by optical detector 205: receiving, by beam combiner 222, first output light 204.1 and second output light 204.2; optically combining, by beam combiner 222, first output light 204.1 and second output light 204.2; communicating combined first output light 204.1 and second output light 204.2 from beam combiner 222 to optical detector 205; and receiving, by demodulator 207, combined first output light 204.1 and second output light 204.2 from beam combiner 222.

Additional steps can be performed in performing multiplexed amplitude modulation photometry with multiplexed amplitude modulation photometer 200. Such steps can include use of trigonometric relationships or fitting processes to determine modulation frequencies 210 and phase factors of modulated light 203. Moreover, such steps can include using demodulation to determine independent measurements of the amounts of analyte 201.

It should be appreciated that performing multiplexed amplitude modulation photometry can be used for simultaneously identifying the locations of two or more analytes in microchannel 213 using a single photodetector. Moreover, performing amplitude demodulation photometry can be used to quantify reproducibility of a measurement of the amount of analyte 201. Analytes flow from first optical region 202.1 to second optical region 202.2 and can be identified and matched, e.g., by comparing signals, with distance between optical regions 202.1 and 202.2 is known, to determine velocity of analyte through time-of-flight measurement between regions (202.1, 202.2).

Multiplexed amplitude modulation photometer 200 and processes disclosed herein have numerous beneficial uses, including using a single photodetector to simultaneously measure multiple analytes at different locations and quantifying uncertainty in measurements of analytes. Advantageously, multiplexed amplitude modulation photometer 200 overcomes limitations of technical deficiencies of conventional compositions such as a need for multiple photodetectors to quantify amounts of analytes at different locations. Further, multiplexed amplitude modulation photometer and processes herein overcome limitations in quantifying measurement uncertainties in amounts of analyte when the analyte only receives modulated light once.

Multiplexed amplitude modulation photometer 200 and processes herein unexpectedly uses modulation frequencies to encode information about position. Moreover, multiplexed amplitude modulation photometer 200 provides multiple measurements of an analyte even when modulated light impinges on an analyte only once.

The articles and processes herein are illustrated further by the following Example, which is non-limiting.

EXAMPLE

In performing multiplexed amplitude modulation photometry, carrier signals of 16 kHz and 20 kHz were generated by controlling the intensity oscillation-frequency of two separate lasers with analog signal generators. The two green (488 nm wavelength) lasers were each driven by a unique carrier frequency and were communicated to different optical regions and combined output light 204 was received on a single optical detector. Output light was combined using a 50/50 fiber optic coupler as beam combiner 222. Output intensity from each optical region (e.g., the positions of modulated light in the optical regions) was extracted from the measured signal as shown in FIG. 6. Microchannel 213 dimensions were approximately 40 micrometers (wide) by 80 micrometers (tall). Optical region 202.1 and optical region 202.2 were spaced 72 mm apart along the microfluidic channel. Fluorescent microspheres approximately 15 micrometers in diameter and labeled with fluorescein were suspended in water and used as analyte 201. Solutions of microspheres at approximate density of 1 million per mL were driven by mass transport through the system using a syringe pump as flow controller 221. A fluorescein emission bandpass optical filter (passband 500-540 nm) was placed in front of the optical detector to remove excitation light at 488 nm. A photomultiplier tube was used as optical detector 205. A multifunction I/O device with analog-to-digital converter having 3.5 MS/s and 16-bit resolution was used to take voltage signals from PMT into a computer for analysis by software.

Figure 7:
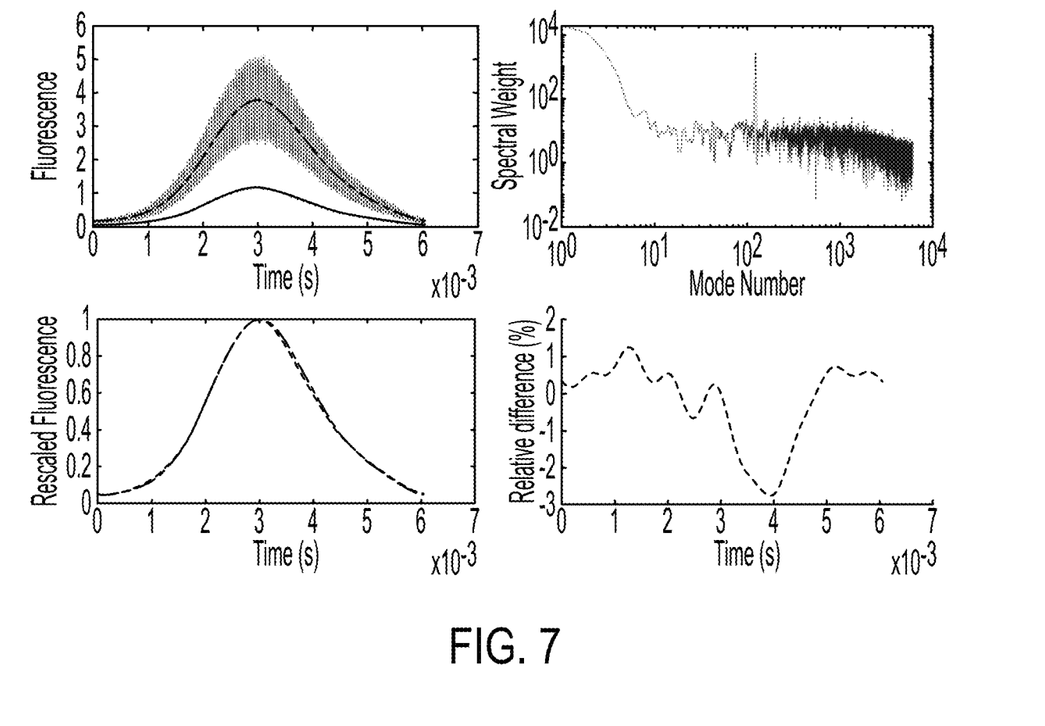
FIG. 7 shows: (A) a graph of fluorescence versus time, (B) a graph of spectral weight versus mode number, (C) a graph of rescaled fluorescence versus time, and (D) a graph of relative difference versus time, wherein graphs are for measurement from both the DC and AC components of a modulated signal. (A): Fluorescence measurement in time as a fluorescent microsphere illuminated with a 20 kHz signal with 3 V peak to peak modulation and IV DC bias. Curved traces represent DC and AC components of the signal. (B): Spectrum of the bead fluorescence showing the carrier frequency at 20 kHz. (C): Overlay of the normalized AC and DC components of the measurement signal. (D) the representative point-wise difference from their mean.

The AC/DC repeat measurements were achieved with a single carrier frequency of 20 kHz at one optical region 202. Using a low pass filter (in software), the DC component was extracted from the acquired signal. An amplitude demodulation process was used to extract the AC component (in software), which by having a single source of fluorescence, was a scaled version of the DC measurement. Data analysis confirms the AC and DC components of the signal are equivalent with high precision, as shown in FIG. 7.

Figure 8:
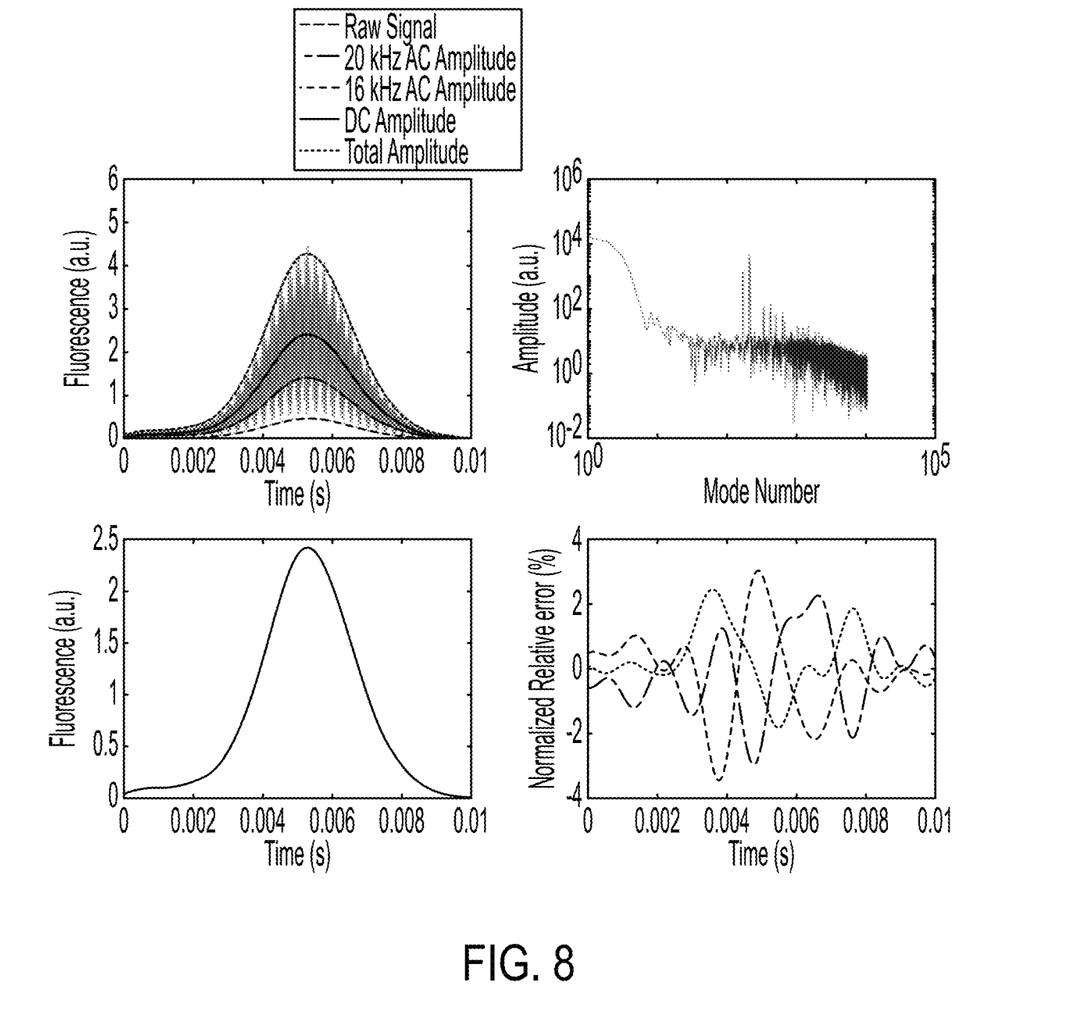
Figure 9:
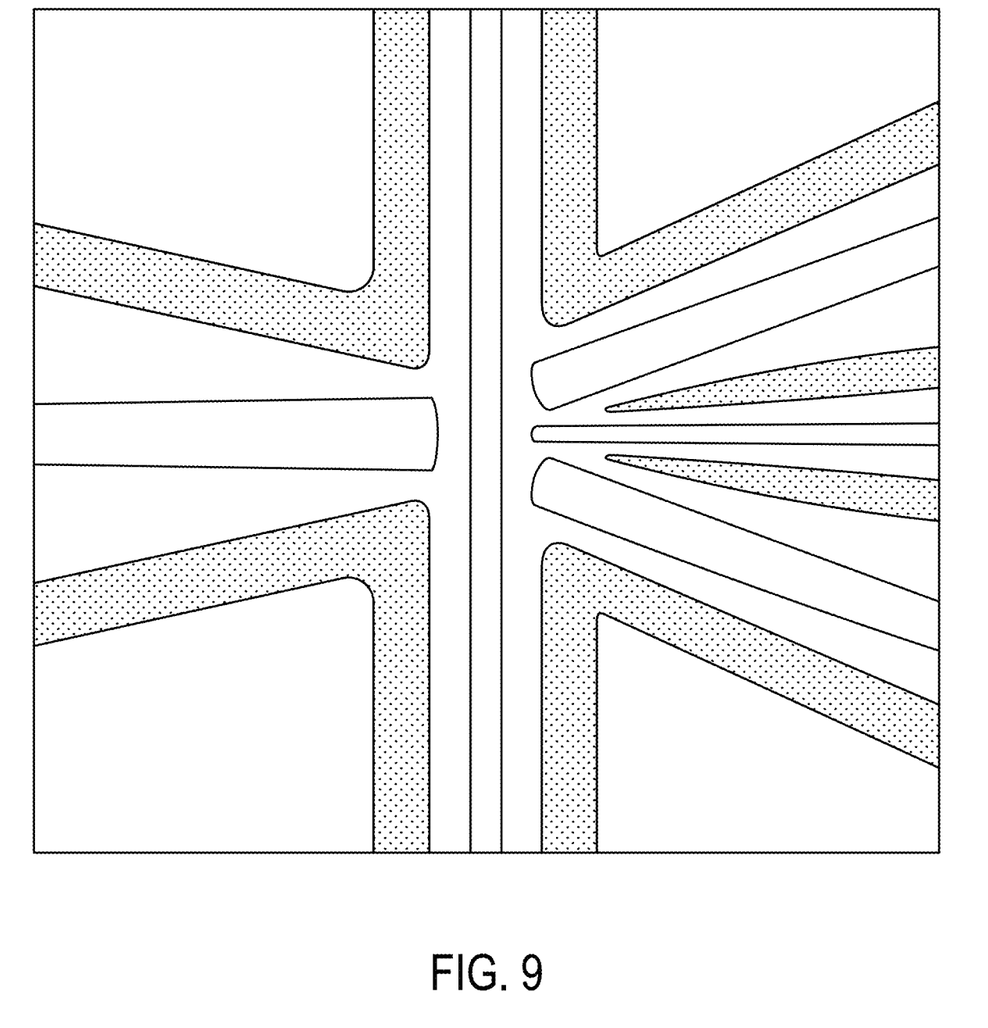
FIG. 9 shows a microscope image of the area around an optical region of a multiplexed amplitude modulation photometer. Light blocking structures including opaque PDMS are shown and appear as black channels to minimize leakage of light from one waveguide to contaminate the signal of another waveguide.

To demonstrate demodulation of overlapping signals, as well as AC/DC measurements, laser light was communicated from two lasers of the same color and modulated at different frequencies to a single optical region 202 on the flow channel, through which fluorescent beads were flowing (FIG. 8). The amplitude of fluorescence associated with each carrier frequency, as well as the DC component, was extracted and compared to determine variation from the mean of the three signals. Performing multiplexed amplitude modulation photometry can be used to multiplex more than two measurements with the carrier intensity-frequencies well-separated. Further, performing multiplexed amplitude modulation photometry involves distinct carrier frequencies (or the DC component) to repeat measurements instead of using lasers of different colors.

Signal separation was achieved with errors of less than 1% in integrated areas when multiplexing two measurements having characteristic inverse times of 100 $s^{-1}$ and using carrier intensity-frequencies of 16 kHz and 20 kHz, sampling the detector at 2 MHz. Accordingly, performing multiplexed amplitude modulation photometry provides high-speed measurements (e.g., in microfluidic devices) in which an analyte is in an interrogation optical region for less than 100 microseconds. A configuration using a single, large detector relative to analytes' size and separation distances provides repeat measurements on the same or functionally identical samples, e.g., with 1% error between them. Conventional cytometers have uncertainties about 25% to 50% due to uncertainty of the configuration and are incapable of repeating measurements to determine measurement precision on each object. Such alignment concerns are absent in the multiplexed amplitude modulation photometer.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A process for performing multiplexed amplitude modulation photometry, the process comprising:
    introducing a first analyte in a first optical region;
    subjecting the first analyte to a first modulated light, the first modulated light comprising a first wavelength that is modulated at a first modulation frequency;
    producing, from the first analyte, first output light in response to subjecting the first analyte to the first modulated light, the first output light modulated at the first modulation frequency;
    propagating the first output light to an optical detector from the first optical region;
    receiving, by the optical detector, the first output light;
    introducing a second analyte in a second optical region, the second optical region separated from the first optical region;
    subjecting the second analyte to a second modulated light, the second modulated light comprising a second wavelength that is modulated at a second modulation frequency, the second modulation frequency being different than the first modulation frequency;
    producing, from the second analyte, second output light in response to subjecting the second analyte to the second modulated light, the second output light modulated at the second modulation frequency;
    propagating the second output light to the optical detector from the second optical region;
    receiving, by the optical detector, the second output light;
    producing, by the optical detector, a multiplexed amplitude modulation signal from the first output light and the second output light;
    determining, from the multiplexed amplitude modulation signal, a first amount c1 of the first analyte in the first optical region subjected to the first modulated light and a second amount c2 of the second analyte in the second optical region subjected to the second modulated light to perform multiplexed amplitude modulation photometry;
    receiving, by a demodulator, the multiplexed amplitude modulation signal from the optical detector;
    deconvolving, by the demodulator, the multiplexed amplitude modulation signal to produce a first demodulated signal and a second demodulated signal;
    subjecting first demodulated signal to a first frequency filter to obtain the first amount c1 of first analyte; and
    subjecting second demodulated signal to a second frequency filter to obtain the second amount c2 of second analyte.

2. The process of claim 1, wherein deconvolving the multiplexed amplitude modulation signal comprises applying $\sin(w1*t)$ to the multiplexed amplitude modulation signal as:

$$[c1(t)*(a1+b1*\sin(w1*t))+c2(t)*(a2+b2*\sin(w2*t))]*\sin(w1*t)$$

to produce the first demodulated signal.

3. The process of claim 1, wherein deconvolving the multiplexed amplitude modulation signal comprises applying $\sin(w2*t)$ to the multiplexed amplitude modulation signal as:

$$[c1(t)*(a1+b1*\sin(w1*t))+c2(t)*(a2+b2*\sin(w2*t))]*\sin(w2*t)$$

to produce the second demodulated signal.

4. The process of claim 1, further comprising receiving, by the demodulator, the first modulation frequency of the first output light.

5. The process of claim 1, further comprising receiving, by the demodulator, the second modulation frequency of the second output light.

6. The process of claim 1, further comprising, prior to producing the multiplexed amplitude modulation signal by the optical detector:
    receiving, by a beam combiner, the first output light and the second output light;
    optically combining, by the beam combiner, the first output light and the second output light;
    communicating the combined first output light and second output light from the beam combiner to the optical detector; and
    receiving, by the demodulator, the combined first output light and second output light from the beam combiner.

* * * * *